United States Patent Office 2,963,496
Patented Dec. 6, 1960

2,963,496
9α-HALO-16-DEHYDRO STEROIDS OF THE PREGNANE SERIES

Gordon H. Thomas and Josef Fried, New Brunswick, N.J., assignors to Olin Mathieson Chemical Corporation, New York, N.Y., a corporation of Virginia No Drawing. Filed June 5, 1957, Ser. No. 663,597

5 Claims. (Cl. 260—397.45)

This invention relates to the synthesis of steroids and has for its objects: (1) the provision of an advantageous process of preparing physiologically active steroids of the 9α-halo-Δ$^{4,16}$-pregnadiene series; and (2) the provision of certain new steroids useful either for their own physiological action or as intermediates in said process.

The process of this invention essentially comprises: (a) diketalizing a 9α-halocortisone to form the 3,20-diketal derivative; (b) esterifying the diketal to form the 21-ester thereof; (c) dehydrating this derivative to form a 21-ester 3,20-diketal of a 9α-halo-Δ$^{5,16}$-pregnadiene-21-ol-3,11,20-trione; and (d) deketalizing to produce a 9α-halo-16-dehydrocortisone (a 9α-halo-Δ$^{4,16}$-pregnadiene-21-ol-3,11,20-trione), or alternatively reducing the diketal, with concomitant deacylation, to yield the 11β-hydroxy derivative (i.e., a 3,20-diketal of 9α-halo-Δ$^{5,16}$-pregnadiene-11β,21-diol-3,20-dione and deketalizing to form a 9α-halo-Δ$^{4,16}$-pregnadiene-11β,21-diol-3,20-dione.

The novel compounds of this invention comprise: (A) the 3,20-diketals of 9α-halocortisone which can be represented by the general formula

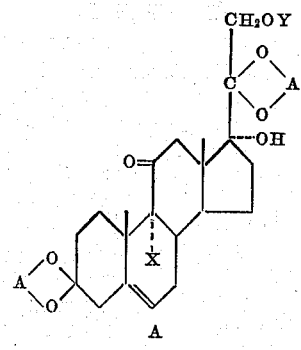

A wherein A is a divalent organic radical, such as lower alkylene (e.g., ethylene, propylene-1,2 and propylene-1,3), X is halogen (preferably chlorine and fluorine), and Y is hydrogen or an acyl radical, especially the acyl radical of a hydrocarbon carboxylic acid having less than ten carbon atoms, as exemplified by the acyl radicals of the lower alkanoic acids (e.g., acetic, propionic and butyric acid), the monocyclic aryl carboxylic acids (e.g., benzoic and toluic acid), the monocyclic aryl lower alkanoic acids (e.g., phenacetic and β-phenyl-propionic acid), the lower alkenoic acids, the cycloalkanecarboxylic acids and the cycloalkenecarboxylic acids; and (B) the 9α-halo-Δ$^{16}$-steroids of the general formula

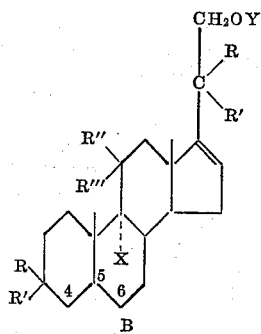

B wherein one of the positions 4,5 and 5,6 is double-bonded, R and R' together are either keto or —O—A—O—, wherein A is as hereinbefore defined, R'' is hydrogen, R''' is β-hydroxy or together R'' and R''' is keto, and X and Y are as hereinbefore defined.

Compounds of Formula B, wherein the double-bond is in the 4,5-position and R and R' together are keto, are new physiologically active steroids which possess glucocorticoid activity and hence can be employed in lieu of known glucocorticoids such as hydrocortisone or cortisone in the treatment of rheumatoid arthritis, for which purpose they can be administered in the same manner as hydrocortisone, for example, the dosage being adjusted for the relative potency of the particular steroid.

The process of this invention can be represented by the following scheme:

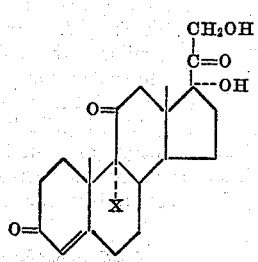

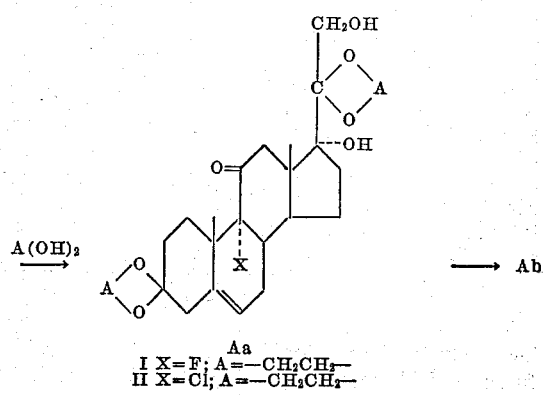

Aa
I X=F; A=—CH$_2$CH$_2$—
II X=Cl; A=—CH$_2$CH$_2$—

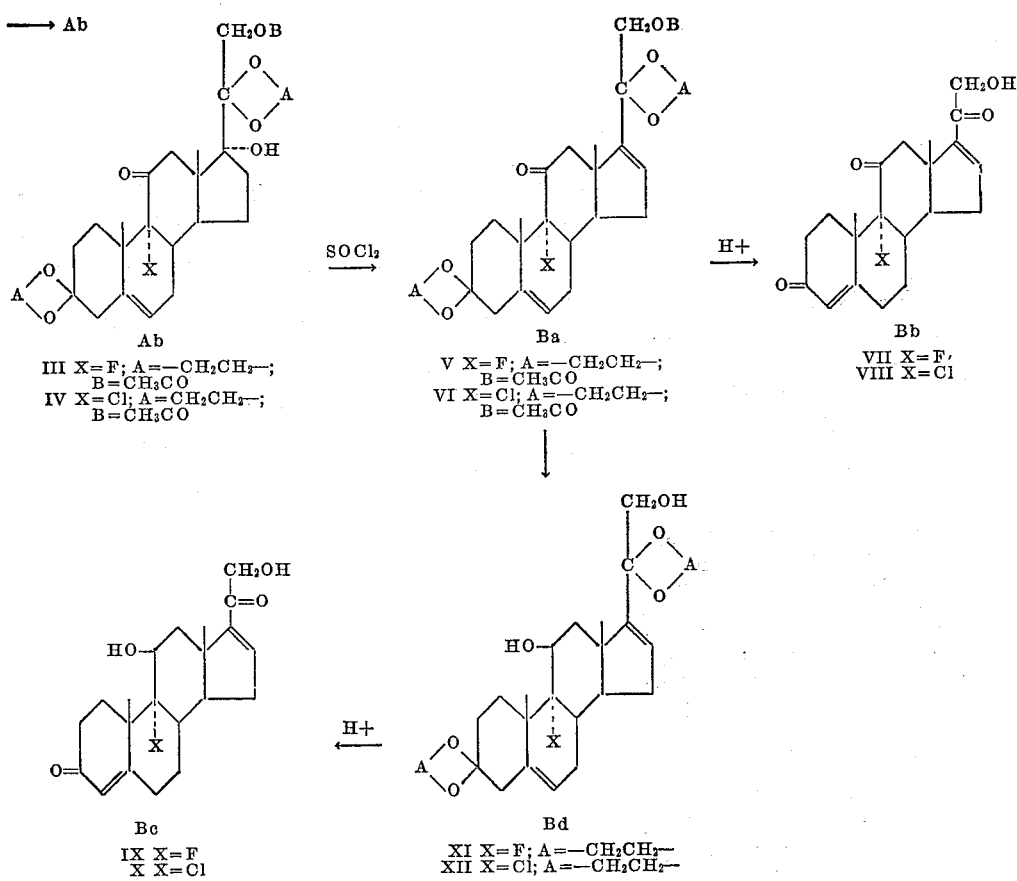

To prepare Compounds B, a 9α-halocortisone (e.g., 9α-fluorocortisone and 9α-chlorocortisone) is diketalized by treatment with an excess of a glycol, A(OH)₂ (e.g., ethylene glycol and propylene glycol). This reaction is preferably conducted at an elevated temperature in the presence of a strong acid catalyst (e.g., p-toluenesulfonic acid). The reaction results in the formation of the 3,20-diketal (Compounds Aa), wherein the ketalizing group corresponds to the glycol used in the preparation.

The diketal, Compound Aa, is then esterified in the usual manner, as by treatment with an acyl halide, BX', or acid anhydride, BOB, wherein B represents the acyl radical of an acid, especially a hydrocarbon carboxylic acid having less than ten carbon atoms (e.g., acetic anhydride). This reaction is preferably carried out in the presence of an organic base, such as pyridine, and yields the 21-ester of the starting diketal (Compounds Ab).

Compound Ab is then treated with thionyl chloride to yield the 16-dehydro derivative. This reaction is preferably conducted in the cold in the presence of an organic base, such as pyridine. The initial product formed is the 3,20-diketal 21-ester of 9α-halo-Δ⁵,¹⁶-pregnadiene-21-ol-3,11,20-trione (Compounds Ba), which can then be deketalized, as by heating with a dilute acid (e.g., dilute sulfuric acid), the reaction preferably being carried out in an organic solvent (e.g., methanol) wherein the diketal is soluble. The reaction results in the formation of a 9α-halo-Δ⁴,¹⁶-pregnadiene - 21 - ol - 3,11,20-trione (Compounds Bb), wherein the initial reactant has not only been deketalized but also hydrolyzed with the removal of the 21-esterifying group. If a 21-ester is desired, the resulting compound can be esterified by the procedure described above to yield the 21-ester.

Compounds Ba can also be reduced, as by treatment with an alkali metal borohydride (e.g., lithium borohydride or sodium borohydride), the reaction preferably being conducted in an organic solvent such as tetrahydrofuran to yield the corresponding 3,20-diketal of 9α-halo-Δ⁵,¹⁶ - pregnadiene-11β,21-diol-3,20-dione (Compounds Bd), which can then be deketalized as above described to yield a 9α-halo-Δ⁴,¹⁶-pregnadiene-11β,21-diol-3,20-dione (Compound Bc).

The following examples illustrate the invention (all temperatures being in centigrade).

EXAMPLE 1

*9α-fluoro-Δ⁵-pregnene-17α,21-diol-3,11,20-trione 3,20-bis-ethylene ketal (I)*

A mixture of 9α-fluorocortisone (15 g.), ethylene glycol (120 ml.), benzene (525 ml.) and p-toluenesulfonic acid monohydrate (240 mg.) is refluxed for 24 hours, the water formed during the reaction being removed azeotropically in a suitable separator. After concentrating the mixture in vacuo to half its volume, it is washed successively with dilute sodium bicarbonate solution and water, and the resulting benzene solution dried over sodium sulfate and then evaporated in vacuo. Trituration of the residue with methanol (100 ml.) yields a solid (about 10.8 g.) which melts at about 243–251°. Crystallization of a sample from acetone-hexane gives the pure bisketal, M.P. about 247–251°; [α]_D −25.7° (c. 1.19 in CHCl₃);

$\lambda_{max.}^{Nujol}$ 2.82, 5.82 μ

*Analysis.*—Calculated for C₂₅H₃₅O₇F: C, 64.36; H, 7.56; F, 4.07. Found: C, 64.56; H, 7.35; F, 3.94.

Similarly, by substituting 9α-chlorocortisone for the 9α-fluorocortisone in the procedure of Example 1, there is obtained 9α-chloro-Δ⁵-pregnene-17α,21-diol-3,11,20-trione 3,20-bis-ethylene ketal (II). Furthermore, if 9α-bromocortisone or 9α-iodocortisone is substituted for 9α-fluorocortisone, the corresponding 9α-bromo and 9α-iodo derivatives are formed.

EXAMPLE 2

*9α-fluoro-Δ⁵-pregnene-17α,21-diol-3,11,20-trione 21-acetate 3,20-bis-ethylene ketal (III)*

A solution of 9α-fluoro-Δ⁵-pregnene-17α,21-diol-3,11, 20-trione 3,20-bis-ethylene ketal (5.91 g.) in pyridine (25 ml.) and acetic anhydride (8 ml.) is allowed to stand at room temperature for 18 hours. The mixture is diluted with iced water, the precipitated solid collected, washed with water and then with methanol. The acetate (about 6.1 g.) is obtained, which melts at about 230–232°. Crystallization from acetone-hexane provides an analytical sample, M.P. about 231–233°; $[\alpha]_D$ −24.6 (c. 0.61 in $CHCl_3$);

$\lambda_{max.}^{Nujol}$ 2.87, 5.73, 5.82 $\mu$

*Analysis.*—Calculated for $C_{27}H_{37}O_8F$: C, 63.76; H, 7.33; F, 3.74. Found: C, 63.80; H, 7.17; F, 3.88.

Similarly, if 9α-chloro-$\Delta^5$-pregnene-17α,21-diol-3,11,20-trione 3,20-bis-ethylene ketal is substituted for the 9α-fluoro reactant in the procedure of Example 2, 9α-chloro-$\Delta^5$-pregnene-17α,21-diol-3,11,20-trione 21-acetate 3,20-bis-ethylene ketal (IV) is obtained. Furthermore, if another acylating reagent such as propionic anhydride or benzoyl chloride is substituted for the acetic anhydride in the procedure of Example 2, the corresponding 21-ester is produced.

EXAMPLE 3

*9α-fluoro-$\Delta^{5,16}$-pregnadiene-21-ol-3,11,20-trione 21-acetate 3,20-bis-ethylene ketal (V) and 9α-fluoro-$\Delta^5$-pregnene-16β,21-oxido-3,11,20-trione 3,20-bis-ethylene ketal*

(a) *9α-fluoro-$\Delta^5$-pregnene-16β,21-oxido-3,11,20-trione 3,20-bis-ethylene ketal*: A solution of 11 g. of 9α-fluoro-$\Delta^5$-pregnene-17α,21-diol-3,11,20-trione 21-acetate 3,20-bis-ethylene ketal in 70 ml. of pyridine and 10 ml. of thionyl chloride is allowed to stand at 0° for 18 hours. The mixture is diluted with iced water and the steroids extracted with chloroform. The chloroform solution is then washed several times with water, dried over sodium sulfate and the solvent removed in vacuo to give about 10.1 g. of a yellow gum. The gum is then dissolved in benzene and absorbed on 250 g. of alumina. Elution with chloroform in benzene (10%, 500 ml.; 20%, 1.1 liters) gives about 1.69 g. of 9α-fluoro-$\Delta^5$-pregnene-16β,21-oxido-3,11,20-trione 3,20-bis-ethylene ketal.

The crude oxido compound is dissolved in 25 ml. of benzene and absorbed on 50 g. of alumina. Elution with 1.5 liters of benzene yields a purified sample (about 962 mg.) melting at about 228–234°. Crystallization from acetone-hexane gives an analytical sample (as the acetone adduct) with the following physical properties: M.P. about 233–234°; $[\alpha]_D$ +29° (c. 0.53 in chloroform);

$\lambda_{max.}^{Nujol}$ 5.79 $\mu$

*Analysis.*—Calculated for $C_{28}H_{39}O_7F$: C, 66.37; H, 7.76; F, 3.75. Found: C, 66.15; H, 7.72; F, 3.74.

(b) *9α-fluoro-$\Delta^{5,16}$-pregnadiene-21-ol-3,11,20-trione 21-acetate 3,20-bis ethylene ketal*: Elution of the alumina first used in section a with chloroform in benzene (30%, 600 ml.) followed by crystallization from acetone-hexane gives 9α-fluoro-$\Delta^{5,16}$-pregnadiene-21-ol-3,11,20-trione 21-acetate 3,20-bis-ethylene ketal (about 1.8 g.) with a double melting point at about 115° and 130–132°; $[\alpha]_D$ −42.3° (c. 0.86 in $CHCl_3$);

$\lambda_{max.}^{Nujol}$ 5.75, 5.79, 6.17, 8.08 $\mu$

*Analysis.*—Calculated for $C_{27}H_{35}O_7F$: C, 66.10; H, 7.19; F, 3.87. Found: C, 66.35; H, 6.83; F, 4.22.

(c) *9α - fluoro - $\Delta^4$ - pregnene - 16β,21 - oxido - 3,11,20-trione*: A solution of 90 mg. of the 9α-fluoro-$\Delta^5$-pregnene - 16β,21 - oxido - 3,11,20 - trione 3,20 - bis-ethylene ketal obtained in section a in 5 ml. of methanol and 0.5 ml. of 8% sulfuric acid is heated under reflux for four hours. The mixture is diluted with water and the steroid extracted with chloroform. The chloroform extract is washed with water, dried over sodium sulfate and the solvent removed in vacuo. Crystallization of the residue from acetone-hexane yields a substance (about 19 mg.) melting at about 239–243°;

$\lambda_{max.}^{alc.}$ 234 m$\mu$ ($\epsilon$=12,700); $\lambda_{max.}^{Nujol}$ 5.80, 5.97, 6.16 $\mu$ (d) *9α - fluoro - $\Delta^5$ - pregnene - 16β,21 - oxido - 11β-ol - 3,20 - dione 3,20 - bis - ethylene ketal*: A solution of 250 mg. of 9α-fluoro-$\Delta^5$-pregnene-16β, 21-oxido-3,11, 20 trione 3,20-bis-ethylene ketal and 200 mg. of sodium borohydride in 20 ml. of 10% aqueous methanol is heated under reflux for 18 hours. The solution is diluted with water, the precipitate collected and crystallized from methanol. The resulting 11β-hydroxy compound (about 130 mg.) melts at about 226–228°. Two crystallizations from methanol yield an analytical sample (as the methanol adduct), M.P. about 228–231°; $[\alpha]_D$ −45° (c. 0.86 in chloroform);

$\lambda_{max.}^{Nujol}$ 2.87, 2.92 $\mu$

*Analysis.*—Calculated for $C_{26}H_{39}O_7F$: C, 64.73; H, 8.15; F, 3.94. Found: C, 65.67; H, 8.38; F, 3.93.

Hydrolysis of this compound as described in section c, except that the time of reflux is 1.5 hours, furnishes 9α - fluoro - $\Delta^4$ - pregnene - 16β,21 - oxido - 11β - ol - 3, 20-dione.

Similarly, by following the procedures of sections a and b of Example 3, 9α-chloro-$\Delta^5$-pregnene-17α,21-diol-3,11,20-trione 21-acetate 3,20-bis-ethylene ketal yields 9α - chloro - $\Delta^{5,16}$ - pregnadiene - 21 - ol - 3,11,20 - trione 21-acetate 3,20-bis-ethylene ketal (VI).

EXAMPLE 4

*9α-fluoro-$\Delta^{4,16}$-pregnadiene-21-ol-3,11,20-trione (VII)*

A solution of 9α-fluoro-$\Delta^{5,16}$-pregnadiene-21-ol-3,11,20-trione 3,20-bis-ethylene ketal 21-acetate (100 mg.) in methanol (10 ml.) and 8% sulfuric acid (1 ml.) is refluxed for 3.5 hours. The mixture is diluted with water, extracted with chloroform and the chloroform phase washed with water, dilute sodium bicarbonate and again with water, dried over sodium sulfate and the solvent evaporated to dryness in vacuo. The residue on crystallization from acetone furnishes pure 9α-fluoro-$\Delta^{4,16}$-pregnadiene-21-ol-3,11,20-dione.

Similarly 9α - chloro - $\Delta^{5,16}$ - pregnadiene - 21 - ol - 3,11,20-trione 21-acetate 3,20-bis-ethylene ketal can be deketalized to 9α-chloro-$\Delta^{4,16}$-pregnadiene-21-ol-3,11,20-trione (VIII).

EXAMPLE 5

*9α - fluoro - $\Delta^{5,16}$ - pregnadiene - 11β,21 - diol - 3,20-dione 3,20-bis-ethylene ketal (XI)*

To a solution of 200 mg. of 9α-fluoro-$\Delta^{5,16}$-pregnadiene-21-ol-3,11,20-trione 3,20-bis-ethylene ketal 21-acetate in tetrahydrofuran (10 ml.) is added 200 mg. of lithium borohydride and the resulting mixture stirred for 18 hours at room temperature. The mixture is diluted with water and the steroid extracted with chloroform. The chloroform extract is washed with water, dried over sodium sulfate and the solvent removed in vacuo. The crude residue (about 197 mg.), after one recrystallization from acetone-hexane, melts at about 192–194°.

Similarly, but holding the temperature at 0° for 6 hours, 9α - chloro - $\Delta^{5,16}$ - pregnadiene - 21 - ol - 3,11, 20-trione 3,20-bis-ethylene ketal 21-acetate yields 9α-chloro - $\Delta^{5,16}$ - pregnadiene - 11β,21 - diol - 3,20 - dione 3,20-bis-ethylene ketal (XII).

EXAMPLE 6

*9α-fluoro-$\Delta^{4,16}$-pregnadiene-11β,21-diol-3,20-dione (IX)*

By following the procedure of Example 4, but substituting 9α -fluoro - $\Delta^{5,16}$ - pregnadiene - 11β,21 - diol - 3, 20-dione 3,20-bis-ethylene ketal for the steroid reactant in that example and refluxing for only one hour, there is obtained 9α-fluoro-$\Delta^{4,16}$-pregnadiene-11β,21-diol-3,20-dione.

Similarly 9α - chloro - $\Delta^{5,16}$ - pregnadiene - 11β,21 - diol-3,20-dione 3,20-bis-ethylene ketal yields 9α-chloro-$\Delta^{4,16}$-pregnadiene-11β,21-diol-3,20-dione (X).

EXAMPLE 7

*9α-fluoro-Δ$^{4,16}$-pregnadiene-21-ol-3,11,20-trione 21-acetate*

A solution of 50 mg. of 9α-fluoro-Δ$^{4,16}$-pregnadiene-21-ol-3,11,20-trione in 0.5 ml. of pyridine and 0.5 ml. of acetic anhydride is allowed to stand overnight at room temperature. After removal of the reagents in vacuo, the residue is crystallized from acetone-hexane. It represents the 21-acetate.

Similarly, by substituting 9α-fluoro-Δ$^{4,16}$-pregnadiene-11β,21-diol-3,20-dione, 9α-chloro-Δ$^{4,16}$-pregnadiene-21-ol-3,11,20-trione and 9α-chloro-Δ$^{4,16}$-pregnadiene-11β,21-diol-3,20-dione for the 9α-fluoro-Δ$^{4,16}$-pregnadiene-21-ol-3,11,20-trione in the procedure of Example 7, the respective 21-acetates are formed. Furthermore, if another acylating agent such as propionic anhydride or benzoyl chloride is substituted for the acetic anhydride in Example 7, the corresponding 21-ester is produced.

The invention may be otherwise variously embodied within the scope of the appended claims.

What is claimed is:

1. 9α - halo - Δ$^{4,16}$ - pregnadiene - 21 - ol - 3,11,20-trione.
2. 9α - fluoro - Δ$^{4,16}$ - pregnadiene - 21 - ol - 3,11,20-trione.
3. 9α - halo - Δ$^{4,16}$ - pregnadiene - 11β,21 - diol-3,20-dione.
4. 9α - fluoro - Δ$^{4,16}$ - pregnadiene - 11β,21 - diol - 3,20-dione.
5. A compound of the general formula

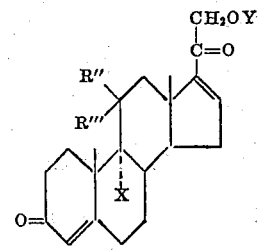

wherein R″ is hydrogen, R‴ is β-hydroxy and together R″ and R‴ is keto, X is halogen, and Y is selected from the group consisting of hydrogen and the acyl radical of a hydrocarbon carboxylic acid having less than ten carbon atoms.

References Cited in the file of this patent

UNITED STATES PATENTS 2,854,383    Herzog _____ Sept. 30, 1958

OTHER REFERENCES

Allen: J.A.C.S., vol. 77, pages 1028–1032, February 20, 1955.

Allen: J.A.C.S., vol. 76, pages 6116–6119, December 5, 1954.

Fried: J.A.C.S., vol. 76, pages 1455–1456. March 5, 1954.